United States Patent
Uramoto et al.

(12)

(10) Patent No.: US 12,122,081 B2
(45) Date of Patent: Oct. 22, 2024

(54) PLASTICIZING DEVICE, INJECTION MOLDING DEVICE, AND THREE-DIMENSIONAL SHAPING DEVICE

(71) Applicant: SEIKO EPSON CORPORATION, Tokyo (JP)

(72) Inventors: Asami Uramoto, Shiojiri (JP); Hidenobu Maruyama, Azumino (JP); Kenta Anegawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/424,721

(22) Filed: Jan. 26, 2024

(65) Prior Publication Data
US 2024/0253283 A1 Aug. 1, 2024

(30) Foreign Application Priority Data
Jan. 30, 2023 (JP) ................................. 2023-011788

(51) Int. Cl.
| | |
|---|---|
| *B29C 45/46* | (2006.01) |
| *B29C 45/47* | (2006.01) |
| *B29C 45/60* | (2006.01) |
| *B29C 45/74* | (2006.01) |
| *B29C 45/17* | (2006.01) |

(Continued)

(52) U.S. Cl.
CPC ............ *B29C 45/464* (2013.01); *B29C 45/47* (2013.01); *B29C 45/60* (2013.01); *B29C 45/74* (2013.01); *B29C 2045/1792* (2013.01); *B29K 2021/00* (2013.01); *B29K 2105/251* (2013.01)

(58) Field of Classification Search
None
See application file for complete search history.

(56) References Cited

U.S. PATENT DOCUMENTS

| | | | |
|---|---|---|---|
| 2020/0094476 A1* | 3/2020 | Yamasaki | ............. B33Y 40/10 |
| 2022/0371248 A1 | 11/2022 | Maruyama | |
| 2022/0379536 A1 | 12/2022 | Yamaguchi | |

FOREIGN PATENT DOCUMENTS

| | | |
|---|---|---|
| JP | 2010-241016 A | 10/2010 |
| JP | 2022-180046 A | 12/2022 |
| JP | 2022-181329 A | 12/2022 |

* cited by examiner

*Primary Examiner* — Armand Melendez
(74) *Attorney, Agent, or Firm* — WORKMAN NYDEGGER

(57) ABSTRACT

A plasticizing device includes: a flat screw having a groove formation surface in which a spiral groove is formed and configured to rotate about a rotation axis by a motor; a barrel having a facing surface facing the groove formation surface in a direction of the rotation axis; a heater configured to heat the material supplied between the groove formation surface and the facing surface; and a screw case accommodating the flat screw and having a supply port through which the material is supplied to the groove. The flat screw includes a first side surface in which an introduction port for introducing the material from the supply port into the groove is partially formed, and a second side surface provided on a side farther away from the barrel than the first side surface. A first distance which is a shortest distance between the first side surface and the screw case is larger than a second distance which is a shortest distance between the second side surface and the screw case, and a recessed portion is formed in the second side surface.

7 Claims, 13 Drawing Sheets

(51) Int. Cl.
*B29K 21/00* (2006.01)
*B29K 105/00* (2006.01)

PLASTICIZING DEVICE, INJECTION MOLDING DEVICE, AND THREE-DIMENSIONAL SHAPING DEVICE

The present application is based on, and claims priority from JP Application Serial Number 2023-011788, filed Jan. 30, 2023, the disclosure of which is hereby incorporated by reference herein in its entirety.

BACKGROUND

1. Technical Field

The present disclosure relates to a plasticizing device, an injection molding device, and a three-dimensional shaping device.

2. Related Art

There is known an injection molding device which injects a material plasticized by a plasticizing device toward a cavity and molds a molded product by curing the material.

For example, JP A-2010-241016 describes a plasticizing and feeding device including a barrel in which a material inflow passage opens at one end surface, a rotor having an end surface that is in sliding contact with the one end surface of the barrel, and a spiral groove formed on the end surface of the rotor and communicating with an open end of the material inflow passage of the barrel.

JP A-2010-241016 is an example of the related art.

When a material is plasticized by the plasticizing and feeding device including the rotor as described above, the material enters a gap between a side surface of the rotor and a case accommodating the rotor and is rubbed and crushed, so that rotation of the rotor is inhibited, and stable plasticization may not be performed.

SUMMARY

A plasticizing device according to an aspect of the present disclosure includes:
  a motor;
  a flat screw having a groove formation surface in which a spiral groove is formed and configured to rotate about a rotation axis by the motor;
  a barrel having a facing surface facing the groove formation surface in a direction of the rotation axis and having a communication hole into which a plasticized material obtained by plasticizing a material flows;
  a heater configured to heat the material supplied between the groove formation surface and the facing surface; and
  a screw case accommodating the flat screw and having a supply port through which the material is supplied to the groove, in which
  the flat screw includes
    a first side surface in which an introduction port for introducing the material from the supply port into the groove is partially formed, and
    a second side surface provided on a side farther away from the barrel than the first side surface,
  a first distance which is a shortest distance between the first side surface and the screw case is larger than a second distance which is a shortest distance between the second side surface and the screw case, and
  a recessed portion is formed in the second side surface.

An injection molding device according to an aspect of the present disclosure includes:
  the plasticizing device according to the aspect; and
  a nozzle configured to inject the plasticized material into a molding mold.

A three-dimensional shaping device according to an aspect of the present disclosure includes:
  the plasticizing device according to the aspect; and
  a nozzle configured to dispense the plasticized material toward a stage.

DESCRIPTION OF EMBODIMENTS

Hereinafter, a preferred embodiment of the present disclosure will be described in detail with reference to the drawings. The embodiment to be described below does not unduly limit contents of the present disclosure described in the claims. In addition, not all configurations to be described below are necessarily essential components of the present disclosure.

1. Injection Molding Device 1.1. Overall Configuration

Figure 1:
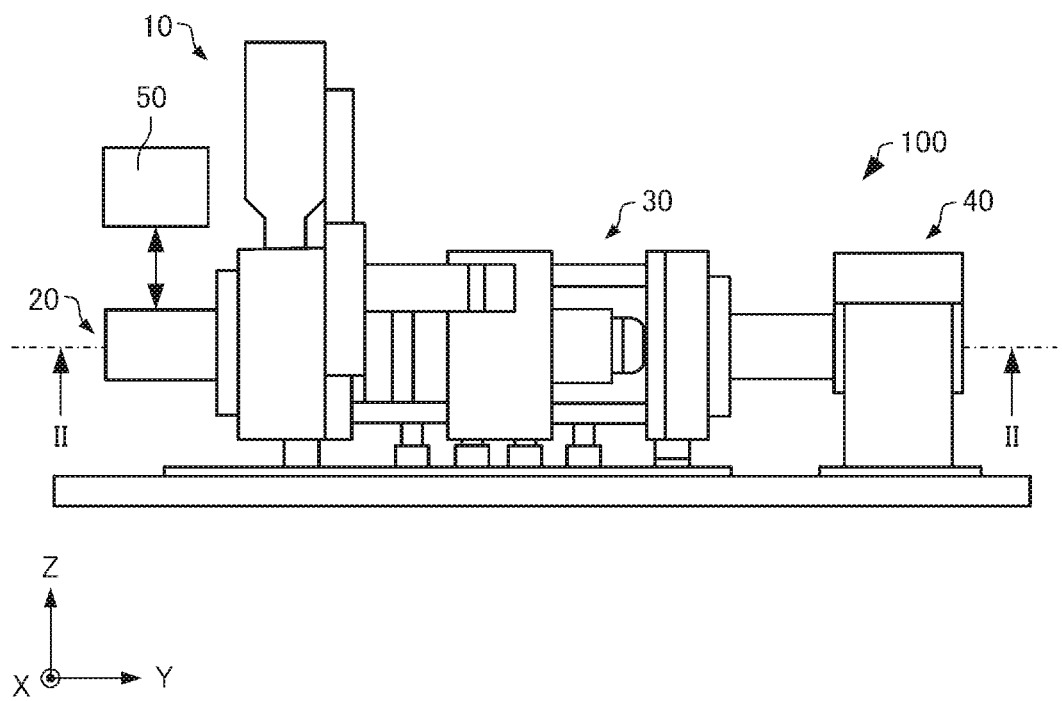
FIG. 1 is a side view schematically showing an injection molding device according to an embodiment.

First, an injection molding device according to the embodiment will be described with reference to the drawings. FIG. 1 is a side view schematically showing an injection molding device 100 according to the embodiment. FIG. 1 shows an X-axis, a Y-axis, and a Z-axis as three axes orthogonal to one another. An X-axis direction and a Y-axis direction are, for example, horizontal directions. A Z-axis direction is, for example, a vertical direction.

As shown in FIG. 1, the injection molding device 100 includes, for example, a material supply unit 10, an injection unit 20, a mold portion 30, a mold clamping unit 40, and a control unit 50.

The material supply unit 10 supplies a material serving as a raw material to the injection unit 20. The material supply unit 10 may be implemented by a hopper. A shape of the material supplied from the material supply unit 10 is, for example, a pellet shape or a powder shape.

The material supplied from the material supply unit 10 includes an elastomer. The material supplied from the material supply unit 10 is, for example, an elastomer. Examples of the elastomer include polystyrene (TPS), olefin/alkene (TPO), polyvinyl chloride (TPVC), polyurethane (TPU), polyester (TPEE), and polyamide (TPAE).

The injection unit 20 plasticizes the material supplied from the material supply unit 10 to obtain a plasticized material. The injection unit 20 injects the plasticized material toward the mold portion 30.

"Plasticize" is a concept including melting, and means changing from a solid state to a flowable state. Specifically, for a material in which glass transition occurs, the "plasticize" refers to setting a temperature of the material to be equal to or higher than a glass transition point. For a material in which the glass transition does not occur, the "plasticize" refers to setting the temperature of the material to a temperature equal to or higher than a melting point.

A cavity corresponding to a shape of a molded product is formed in the mold portion 30. The plasticized material injected from the injection unit 20 flows into the cavity. Then, the plasticized material is cooled and solidified to generate the molded product.

The mold clamping unit 40 opens and closes the mold portion 30. The mold clamping unit 40 opens the mold portion 30 after the plasticized material is cooled and solidified. Accordingly, the molded product is dispensed to the outside.

The control unit 50 is implemented by, for example, a computer including a processor, a main storage device, and an input and output interface that inputs and outputs a signal from and to the outside. The control unit 50 exerts various functions by, for example, executing, by the processor, a program read into the main storage device. Specifically, the control unit 50 controls the injection unit 20 and the mold clamping unit 40. The control unit 50 may be implemented by a combination of a plurality of circuits instead of the computer.

1.2. Specific Configuration

Figure 2:
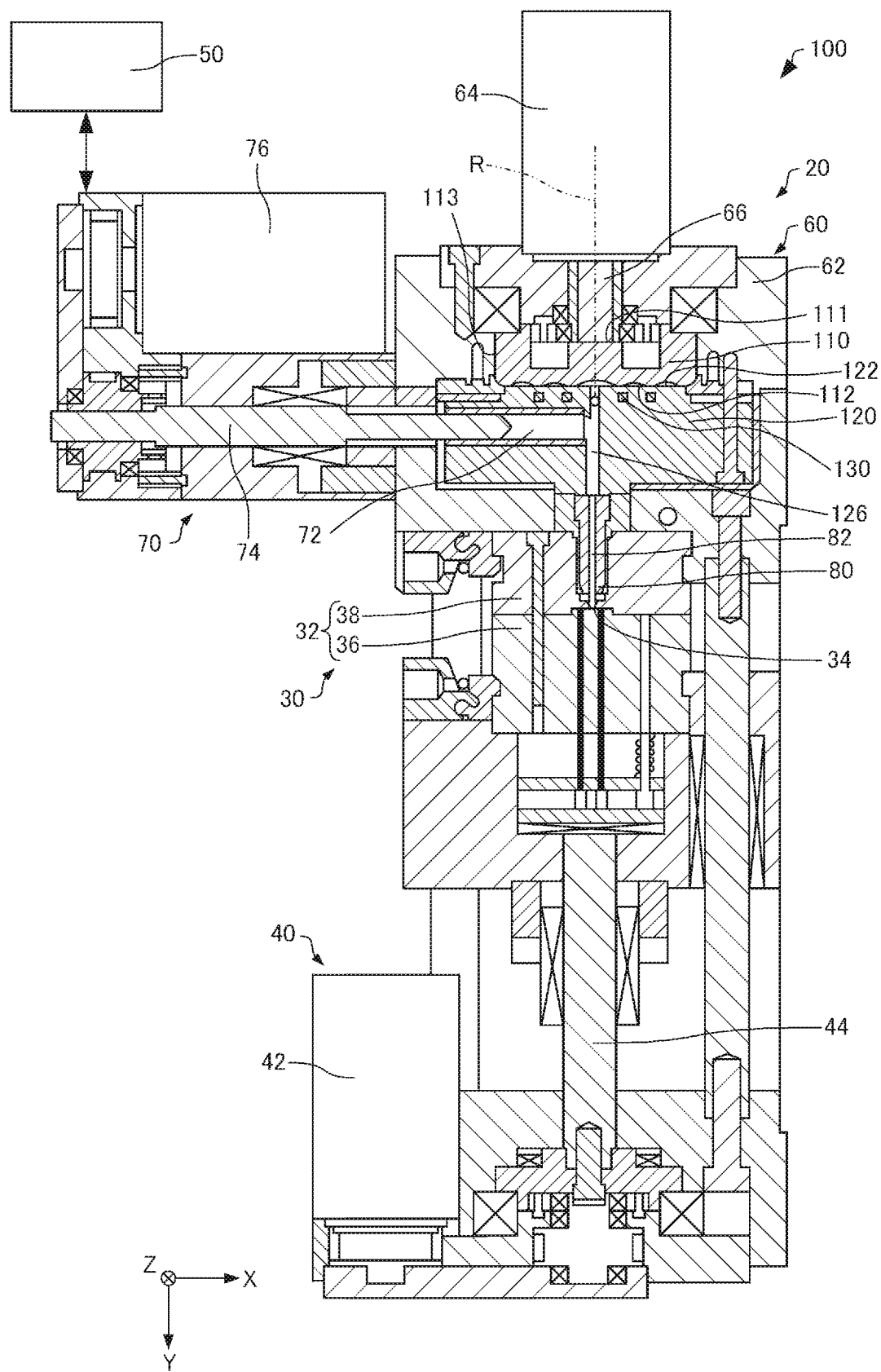
FIG. 2 is a cross-sectional view schematically showing the injection molding device according to the embodiment.

FIG. 2 is a cross-sectional view taken along a line II-II of FIG. 1 schematically showing the injection molding device 100. As shown in FIG. 2, the injection unit 20 includes, for example, a plasticizing device 60, an injection mechanism 70, and a nozzle 80.

The plasticizing device 60 is configured to plasticize the material supplied from the material supply unit 10, generate a flowable plasticized material in a paste shape, and guide the plasticized material to the injection mechanism 70. The plasticizing device 60 includes, for example, a screw case 62, a drive motor 64, a flat screw 110, a barrel 120, and a heater 130.

The screw case 62 is a housing that accommodates the flat screw 110. The flat screw 110 is accommodated in a space surrounded by the screw case 62 and the barrel 120. For convenience, the flat screw 110 is shown in a simplified manner in FIG. 2.

The drive motor 64 is coupled to the screw case 62. The drive motor 64 rotates the flat screw 110. The drive motor 64 is, for example, a servomotor. A shaft 66 of the drive motor 64 is coupled to the flat screw 110. The drive motor 64 is controlled by the control unit 50.

The flat screw 110 has a substantially cylindrical shape in which a size in a direction of a rotation axis R is smaller than a size in a direction orthogonal to the direction of the rotation axis R. In a shown example, the rotation axis R is parallel to the Y-axis. The flat screw 110 is rotated about the rotation axis R by a torque generated by the drive motor 64. The flat screw 110 has a motor surface 111 on the drive motor 64 side, a groove formation surface 112 on a side opposite to the motor surface 111, and a side surface 113 coupled to the groove formation surface 112. Here, FIG. 3 is a perspective view schematically showing the flat screw 110.

Figure 3:
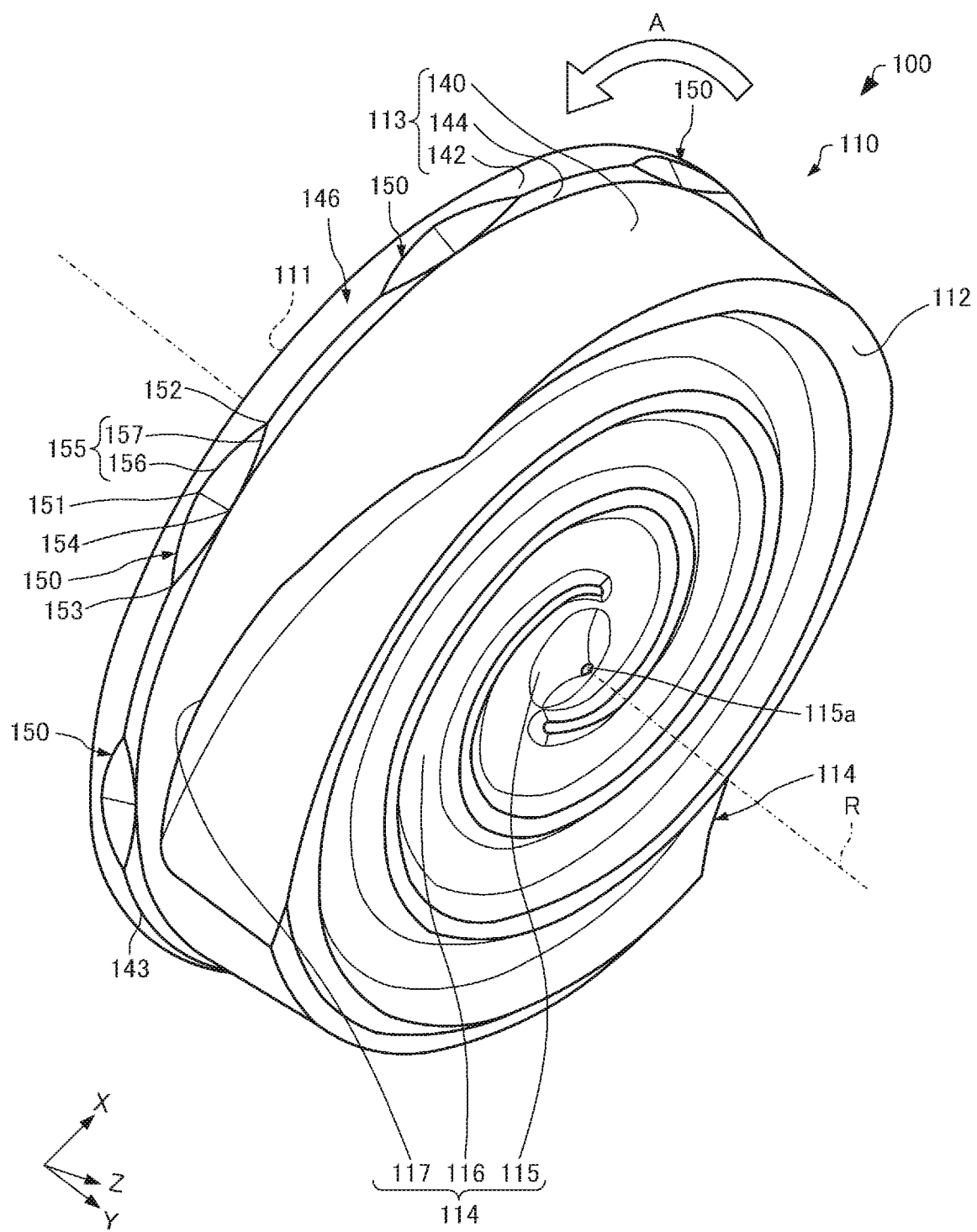
FIG. 3 is a perspective view schematically showing a flat screw of the injection molding device according to the embodiment.

As shown in FIG. 3, first grooves 114 are formed in the groove formation surface 112 of the flat screw 110. The first groove 114 has a spiral shape. The first groove 114 includes, for example, a central portion 115, a coupling portion 116, and an introduction port 117. The central portion 115 faces a communication hole 126 formed in the barrel 120. The central portion 115 communicates with the communication hole 126. The central portion 115 is provided with a protruding portion 115a for efficiently feeding the plasticized material to the communication hole 126. The coupling portion 116 couples the central portion 115 to the introduction port 117. In the shown example, the coupling portion 116 is formed in a spiral shape from the central portion 115 toward an outer periphery of the groove formation surface 112. The introduction port 117 is formed on the outer periphery of the groove formation surface 112. That is, the introduction port 117 is formed on the side surface 113 of the flat screw 110. The material supplied from the material supply unit 10 is introduced from the introduction port 117 into the first grooves 114, passes through the coupling portion 116 and the central portion 115, and is conveyed to the communication hole 126 formed in the barrel 120. In the shown example, two first grooves 114 are formed.

The number of the first grooves 114 is not particularly limited. Although not shown, three or more first grooves 114 may be formed, or only one first groove 114 may be formed. Details of the flat screw 110 will be described later.

As shown in FIG. 2, the barrel 120 is provided to face the flat screw 110. The barrel 120 has a facing surface 122 facing the groove formation surface 112 of the flat screw 110. The facing surface 122 faces the groove formation surface 112 in the Y-axis direction. The communication hole 126 is formed at a center of the facing surface 122. Here, FIG. 4 is a view schematically showing the barrel 120.

Figure 4:
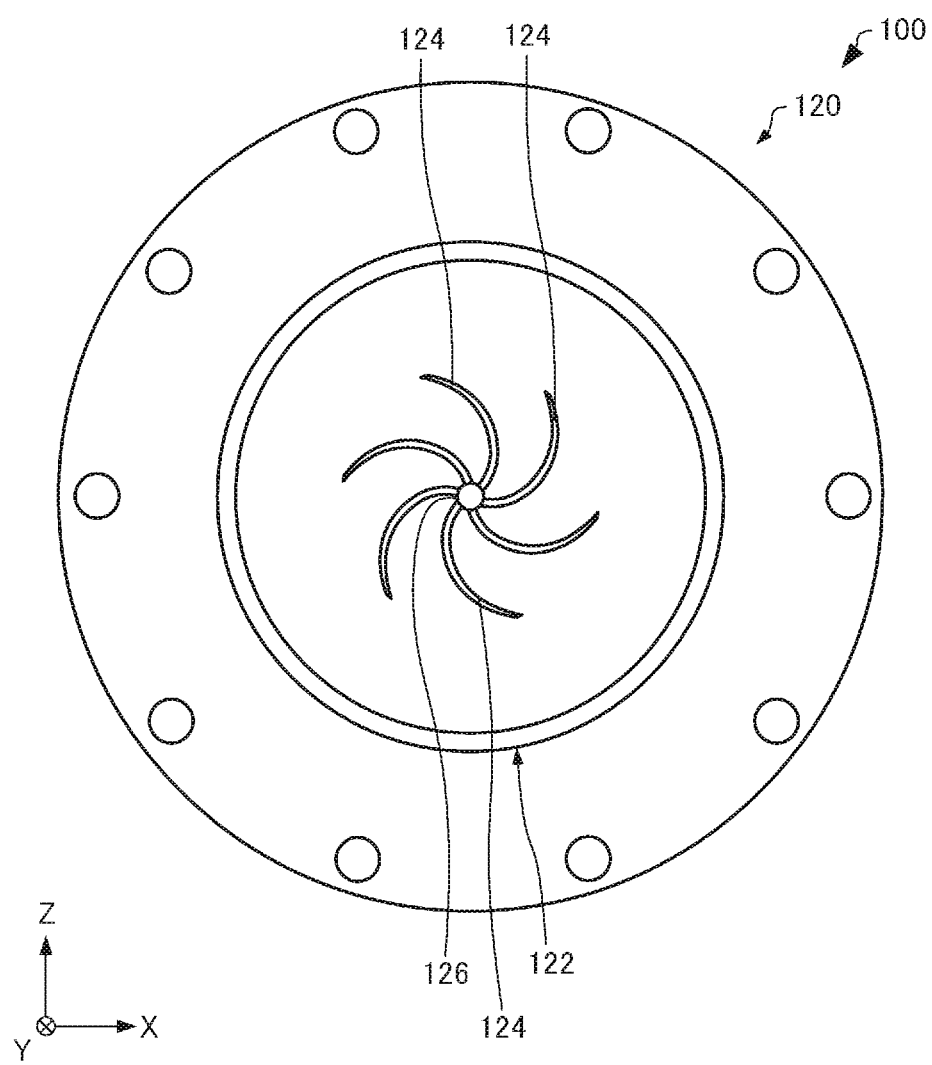
FIG. 4 is a view schematically showing a barrel of the injection molding device according to the embodiment.

As shown in FIG. 4, second grooves 124 and the communication hole 126 are formed in the facing surface 122 of the barrel 120. A plurality of second grooves 124 are formed. In the shown example, six second grooves 124 are formed, and the number of the second grooves 124 is not particularly limited. The plurality of second grooves 124 are formed around the communication hole 126 when viewed from the Y-axis direction. The second groove 124 has one end coupled to the communication hole 126, and extends spirally from the communication hole 126 toward an outer periphery of the facing surface 122. The second groove 124 has a function of guiding the plasticized material to the communication hole 126. The plasticized material flows into the communication hole 126. The communication hole 126 allows the plasticized material that has flowed in to flow out of the barrel 120.

A shape of the second groove 124 is not particularly limited, and may be, for example, a linear shape. The one end of the second groove 124 may not be coupled to the communication hole 126. Further, the second groove 124 may not be formed in the facing surface 122. However, in consideration of efficiently guiding the plasticized material to the communication hole 126, the second groove 124 is preferably formed in the facing surface 122.

As shown in FIG. 2, the heater 130 is provided in the barrel 120. The heater 130 may be provided below the barrel 120. The heater 130 heats the material supplied between the flat screw 110 and the barrel 120. The heater 130 heats the material supplied to the first grooves 114. The heater 130 is controlled by the control unit 50. The plasticizing device 60 generates the plasticized material by heating the material while conveying the material toward the communication hole 126 by the flat screw 110, the barrel 120, and the heater 130, and causes the generated plasticized material to flow out from the communication hole 126 to the injection mechanism 70.

The injection mechanism 70 includes, for example, a cylinder 72, a plunger 74, and a plunger driving unit 76. The cylinder 72 is a substantially cylindrical member coupled to the communication hole 126. The plunger 74 moves inside the cylinder 72. The plunger 74 is driven by the plunger driving unit 76 implemented by a motor, a gear, and the like. The plunger driving unit 76 is controlled by the control unit 50. The cylinder 72 may be coupled to a flow path downstream of the communication hole 126.

The injection mechanism 70 executes a metering operation and an injection operation by sliding the plunger 74 in the cylinder 72. The metering operation refers to an operation of guiding the plasticized material positioned in the communication hole 126 into the cylinder 72 and metering the plasticized material in the cylinder 72 by moving the plunger 74 in the −X-axis direction away from the communication hole 126. The injection operation refers to an operation of injecting the plasticized material in the cylinder 72 into the mold portion 30 through the nozzle 80 by moving the plunger 74 in the +X-axis direction approaching the communication hole 126.

A nozzle hole 82 communicating with the communication hole 126 is formed in the nozzle 80. The nozzle 80 injects the plasticized material supplied from the plasticizing device 60 into a molding mold 32 of the mold portion 30. Specifically, the plasticized material metered in the cylinder 72 is sent from the injection mechanism 70 to the nozzle hole 82 through the communication hole 126 by executing the metering operation and the injection operation described above. The plasticized material is injected from the nozzle hole 82 into the mold portion 30.

The mold portion 30 includes the molding mold 32. The plasticized material sent to the nozzle hole 82 is injected from the nozzle hole 82 into the cavity 34 of the molding mold 32. Specifically, the molding mold 32 includes a movable mold 36 and a fixed mold 38 facing each other, and includes a cavity 34 between the movable mold 36 and the fixed mold 38. The cavity 34 is a space corresponding to the shape of the molded product. The movable mold 36 and the fixed mold 38 are made of metal. The movable mold 36 and the fixed mold 38 may be made of ceramic or a resin.

The mold clamping unit 40 includes, for example, a mold driving unit 42 and a ball screw unit 44. The mold driving unit 42 is implemented by, for example, a motor, a gear, and the like. The mold driving unit 42 is coupled to the movable mold 36 via the ball screw unit 44. The mold driving unit 42 is controlled by the control unit 50. The ball screw unit 44 transmits power generated by the driving of the mold driving unit 42 to the movable mold 36. The mold clamping unit 40 opens and closes the mold portion 30 by moving the movable mold 36 by the mold driving unit 42 and the ball screw unit 44.

1.3. Flat Screw

Figure 5:
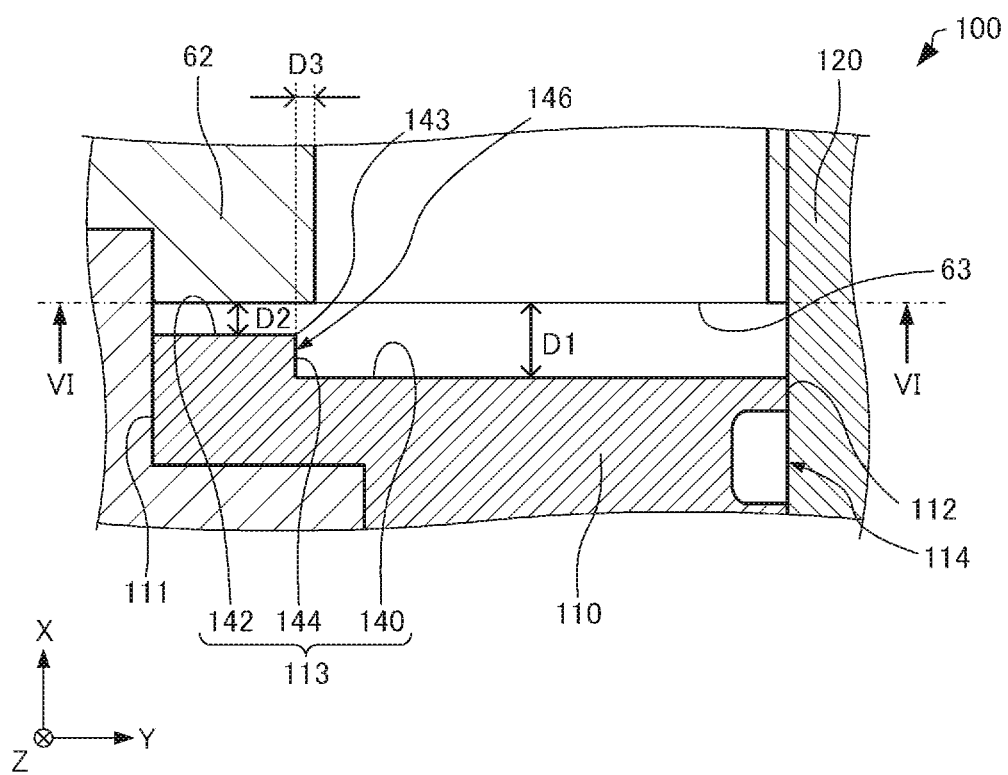
FIG. 5 is a cross-sectional view schematically showing the injection molding device according to the embodiment.

FIG. 5 is a cross-sectional view schematically showing the vicinity of the flat screw 110 of the injection molding device 100.

As shown in FIG. 5, the side surface 113 of the flat screw 110 has a first side surface 140, a second side surface 142, and a coupling surface 144.

The first side surface 140 is provided closer to the barrel 120 than the second side surface 142. In the shown example, the first side surface 140 is provided in the +Y-axis direction of the second side surface 142. The first side surface 140 is, for example, parallel to the Y-axis. The first side surface 140 is coupled to the groove formation surface 112. As shown in FIG. 3, the introduction port 117 for introducing the material into the first groove 114 is partially formed in the first side surface 140.

As shown in FIG. 5, the second side surface 142 is provided on a side further away from the barrel 120 than the first side surface 140. In the shown example, the second side surface 142 is provided in the −Y-axis direction of the first side surface 140. The second side surface 142 is, for example, parallel to the Y-axis.

A size of the second side surface 142 in the Y-axis direction is smaller than a size of the first side surface 140 in the Y-axis direction. A first distance D1, which is a shortest distance between the first side surface 140 and the screw case 62, is larger than a second distance D2, which is a shortest distance between the second side surface 142 and the screw case 62. The second side surface 142 protrudes outward from the first side surface 140. A gap is formed between the second side surface 142 and the screw case 62. When the shape of the material is a pellet shape, the first distance D1 is larger than a maximum length of the material, and the second distance D2 is smaller than the maximum length of the material. In the shown example, the first distance D1 and the second distance D2 are distances in the X-axis direction.

The coupling surface 144 couples the first side surface 140 and the second side surface 142. In the shown example, the coupling surface 144 is orthogonal to the first side surface 140 and the second side surface 142. The coupling surface 144 is, for example, parallel to the X-axis.

The coupling surface 144 and the side surfaces 140 and 142 form a step portion 146 on the side surface 113 of the flat screw 110. The size of the second side surface 142 in the Y-axis direction is, for example, 2 mm or more and 10 mm or less. When the size of the second side surface 142 in the Y-axis direction is 2 mm or more, a strength of the step portion 146 can be ensured. When the size of the second side surface 142 in the Y-axis direction is 10 mm or less, the size of the flat screw 110 can be reduced.

Although not shown, the step portion 146 may not be formed on the side surface 113 of the flat screw 110, and the first distance D1 may be larger than the second distance D2 by forming the step portion on an inner side surface of the screw case 62. Alternatively, step portions may be formed on both the side surface 113 of the flat screw 110 and the inner side surface of the screw case 62, so that the first distance D1 is larger than the second distance D2.

A supply port 63 for supplying the material to the introduction port 117 of the first groove 114 is formed in the screw case 62 accommodating the flat screw 110. The supply port 63 is formed at a position facing the first side surface 140 of the screw case 62. The introduction port 117 introduces the material from the supply port 63 into the first groove 114. A shortest distance between the supply port 63 and the first side surface 140 is larger than the second distance D2.

Figure 6:
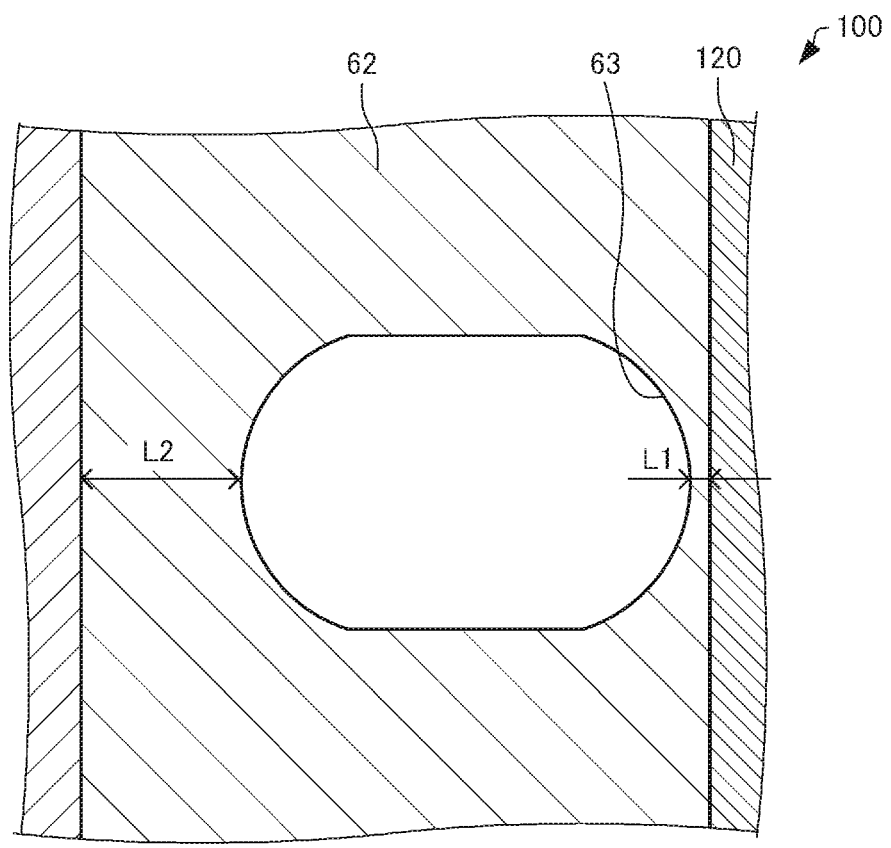
FIG. 6 is a cross-sectional view schematically showing the injection molding device according to the embodiment.

FIG. 6 is a cross-sectional view schematically showing the screw case 62 taken along a line VI-VI in FIG. 5. As shown in FIG. 6, the supply port 63 has an elongated hole shape in which the size in the Y-axis direction is larger than the size in the X-axis direction when viewed from the Z-axis direction. Therefore, the material can easily flow into the first groove 114 from the supply port 63. In the shown example, a shortest distance L1 between the supply port 63 and an end of the screw case 62 in the +Y-axis direction side is smaller than a shortest distance L2 between the supply port 63 and an end of the screw case 62 in the −Y-axis direction side.

When viewed from the direction orthogonal to the direction of the rotation axis R of the flat screw 110, as shown in FIG. 5, an end 143 of the second side surface 142 on the barrel 120 side is positioned outside a contour of the supply port 63. The end 143 of the second side surface 142 does not overlap the supply port 63 when viewed form the X-axis direction. When viewed from the X-axis direction, a third distance D3, which is a shortest distance between the end 143 of the second side surface 142 and the contour of the supply port 63 in the Y-axis direction, is, for example, smaller than the second distance D2.

Figure 7:
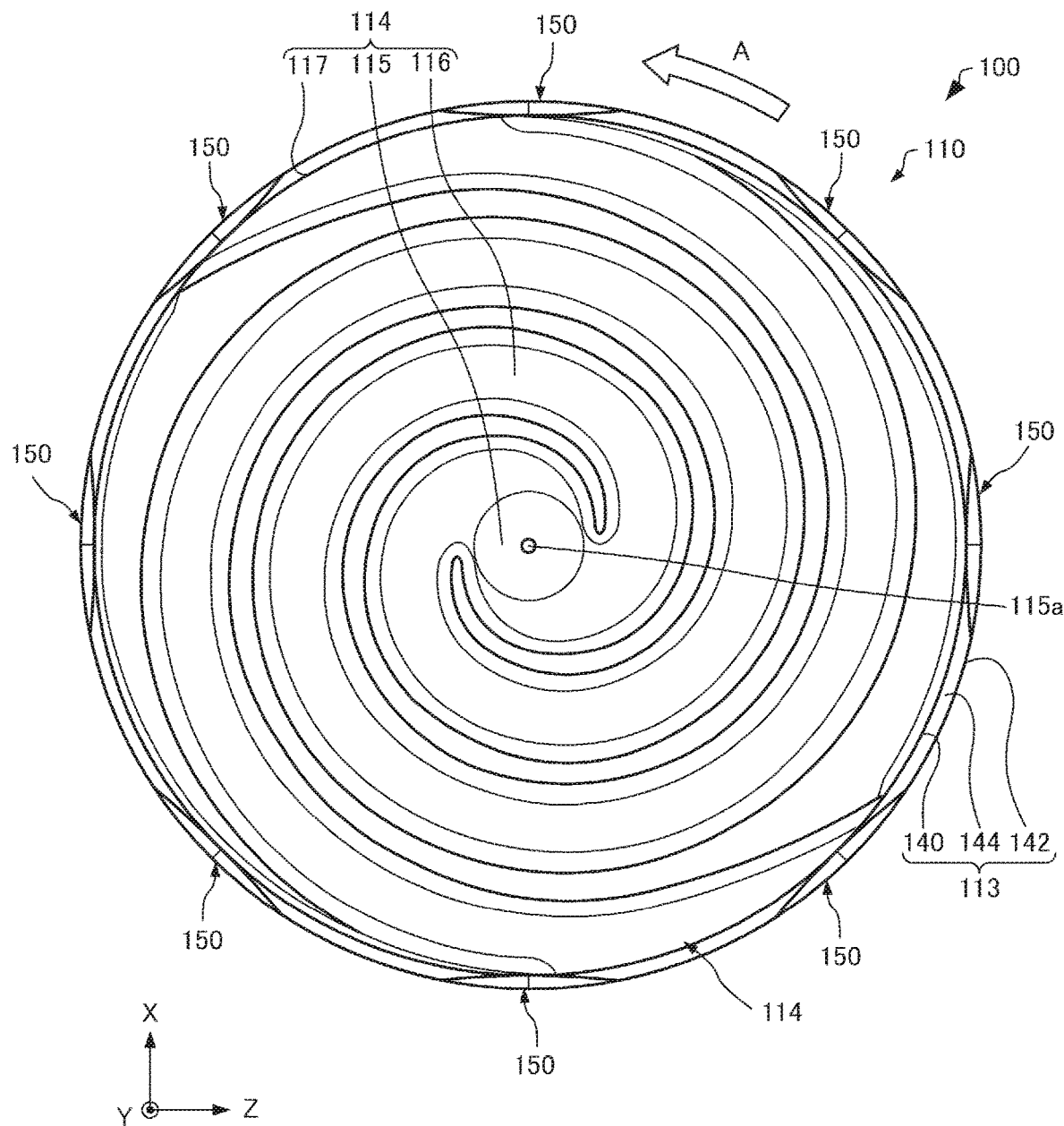
FIG. 7 is a view schematically showing the flat screw of the injection molding device according to the embodiment.
Figure 8:
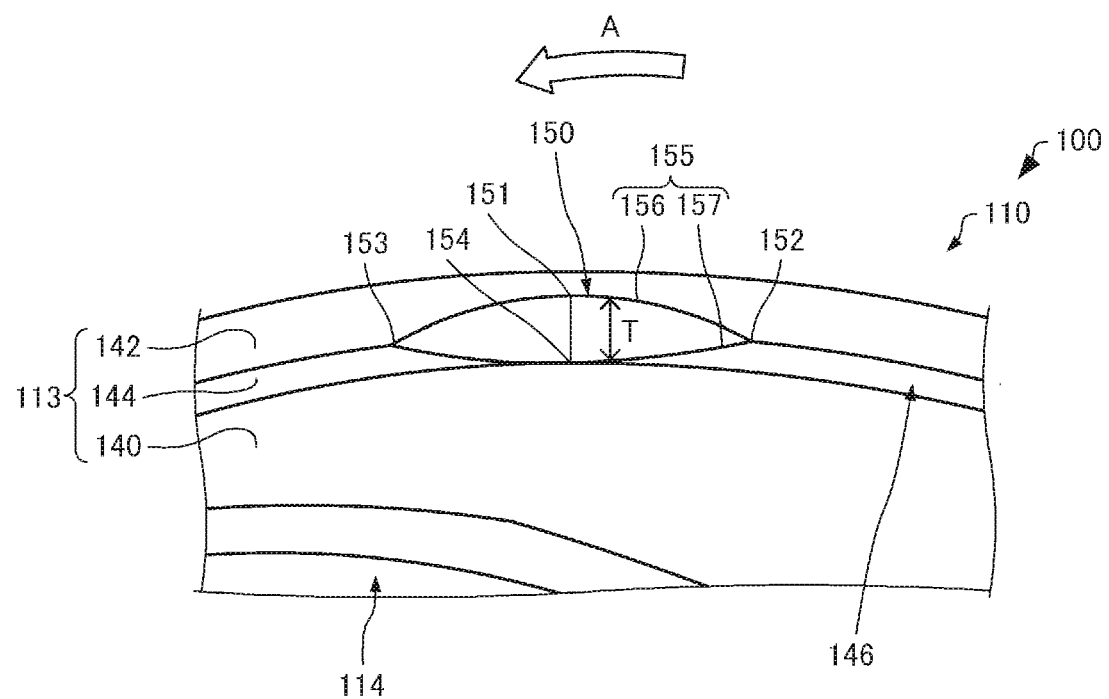
FIG. 8 is a perspective view schematically showing the flat screw of the injection molding device according to the embodiment.

As shown in FIG. 3, recessed portions 150 are formed in the second side surface 142 of the flat screw 110. Here, FIG. 7 is a view schematically showing the flat screw 110 when viewed from the Y-axis direction. FIG. 8 is a perspective view schematically showing the flat screw 110.

As shown in FIGS. 3 and 8, the recessed portions 150 are formed in the second side surface 142 and the coupling surface 144. The recessed portions 150 are, for example, notches formed in the second side surface 142 and the coupling surface 144. The recessed portion 150 is formed by cutting out a corner formed by, for example, coupling the second side surface 142 and the coupling surface 144 to each other.

The recessed portion 150 has, for example, a first end 151, a second end 152, a third end 153, and a fourth end 154. The first end 151 is an end of the recessed portion 150 opposite to the barrel 120. The first end 151 is positioned on the second side surface 142. The second end 152 and the third end 153 are ends of the recessed portion 150 in the second side surface 142 on the barrel 120 side. The second end 152 and the third end 153 are positioned at a boundary between the second side surface 142 and the coupling surface 144. The second end 152 is an end opposite to a rotation direction A of the flat screw 110. The first end 151 is positioned forward of the second end 152 in the rotation direction A. The third end 153 is an end of the flat screw 110 in the rotation direction A. The first end 151 is positioned behind the third end 153 in the rotation direction A. The fourth end 154 is an end of the recessed portion 150 on the barrel 120 side. The fourth end 154 is positioned on the coupling surface 144.

An outer edge 155 of the recessed portion 150 is formed by, for example, a first curve 156 and a second curve 157. The first curve 156 is formed by a corner formed by the second side surface 142 and a bottom surface of the recessed portion 150. The second curve 157 is formed by a corner formed by the coupling surface 144 and the bottom surface of the recessed portion 150.

The first curve 156 and the second curve 157 constituting the outer edge 155 of the recessed portion 150 are coupled to each other at the second end 152. Further, the first curve 156 and the second curve 157 are coupled to each other at the third end 153. As shown in FIG. 8, a distance T between the first curve 156 and the second curve 157 is maximum at the first end 151 and the fourth end 154. The distance T gradually decreases from the first end 151 toward the second end 152. Further, the distance T gradually decreases from the first end 151 toward the third end 153. Although not shown, the outer edge 155 may be formed of a plurality of straight lines.

As shown in FIGS. 3 and 7, a plurality of recessed portions 150 are formed. In the example shown in FIG. 7, eight recessed portions 150 are formed. The plurality of recessed portions 150 are formed at intervals along an outer periphery of the flat screw 110. The outer periphery of the flat screw 110 is defined by the second side surface 142. The plurality of recessed portions 150 are formed at, for example, equal intervals. In the shown example, the rotation direction A of the flat screw 110 is counterclockwise.

1.4. Function and Effect

In the plasticizing device 60, when viewed from the direction orthogonal to the direction of the rotation axis R, the flat screw 110 has the first side surface 140 in which the introduction port 117 for introducing the material from the supply port 63 into the first groove 114 is partially formed, and the second side surface 142 provided on the side farther away from the barrel 120 than the first side surface 140. A first distance D1, which is a shortest distance between the first side surface 140 and the screw case 62, is larger than a second distance D2, which is a shortest distance between the second side surface 142 and the screw case 62. The recessed portion 150 is formed in the second side surface 142.

Therefore, in the plasticizing device 60, even when the material enters the gap between the second side surface 142 and the screw case 62, the material entering the gap can be scraped out by an angle formed by the outer edge 155 of the recessed portion 150. Accordingly, it is possible to reduce the inhibition of the rotation of the flat screw 110 due to the material entering the gap. Accordingly, the material can be stably plasticized. When the material that has entered the gap enters the drive motor side, the rotation of the flat screw may be inhibited.

In the plasticizing device 60, the material includes an elastomer, the shape of the material is a pellet shape, the first distance D1 is larger than the maximum length of the material, and the second distance D2 is smaller than the maximum length of the material. Therefore, in the plasticizing device 60, the material is less likely to enter the gap between the second side surface 142 and the screw case 62 as compared with a case in which the second distance D2 is larger than the maximum length of the material. The elastomer has a small Young's modulus and a large breaking strain, and easily enters a gap.

In the plasticizing device 60, when viewed from the direction orthogonal to the direction of the rotation axis R, the end 143 of the second side surface 142 on the barrel 120 side is positioned outside the contour of the supply port 63, and the third distance D3 which is the shortest distance between the end 143 and the contour of the supply port 63 in the direction of the rotation axis R is smaller than the second distance D2. Therefore, in the plasticizing device 60, the distance between the second side surface 142 and the supply port 63 can be increased as compared with a case in which the end of the second side surface on the barrel side is positioned inside the contour of the supply port. Accordingly, the material is less likely to enter the gap between the second side surface 142 and the screw case 62. Further, a diameter of the supply port 63 can be increased as compared with a case in which the third distance D3 is larger than the second distance D2. Accordingly, it is possible to prevent clogging of the material in the supply port 63.

In the plasticizing device 60, the plurality of recessed portions 150 are formed at intervals along the outer periphery of the flat screw 110. Therefore, in the plasticizing device 60, even when the material enters the gap between the second side surface 142 and the screw case 62, the material entering the gap can be further scraped out.

In the plasticizing device 60, the first end 151 of the recessed portion 150 on the side opposite to the barrel 120 is positioned forward of the second end 152 on the barrel 120 side in the second side surface 142 of the recessed portion 150 in the rotation direction A of the flat screw 110. Therefore, in the plasticizing device 60, even when the material enters the gap between the second side surface 142 and the screw case 62, the material entering the gap can be gradually scraped off together with the flat screw 110 by a portion coupling the first end 151 and the second end 152 in the outer edge 155 of the recessed portion 150. Accordingly, the material entering the gap can be scraped out without inhibiting the rotation of the flat screw 110.

In the plasticizing device 60, the flat screw 110 has the coupling surface 144 that couples the first side surface 140 and the second side surface 142, and the coupling surface 144 is orthogonal to the second side surface 142. Therefore, in the plasticizing device 60, the material is less likely to enter the gap between the second side surface 142 and the screw case 62 as compared with a case in which the coupling surface is inclined at an obtuse angle with respect to the second side surface.

2. Modification of Injection Molding Device
2.1. First Modification

Figure 9:
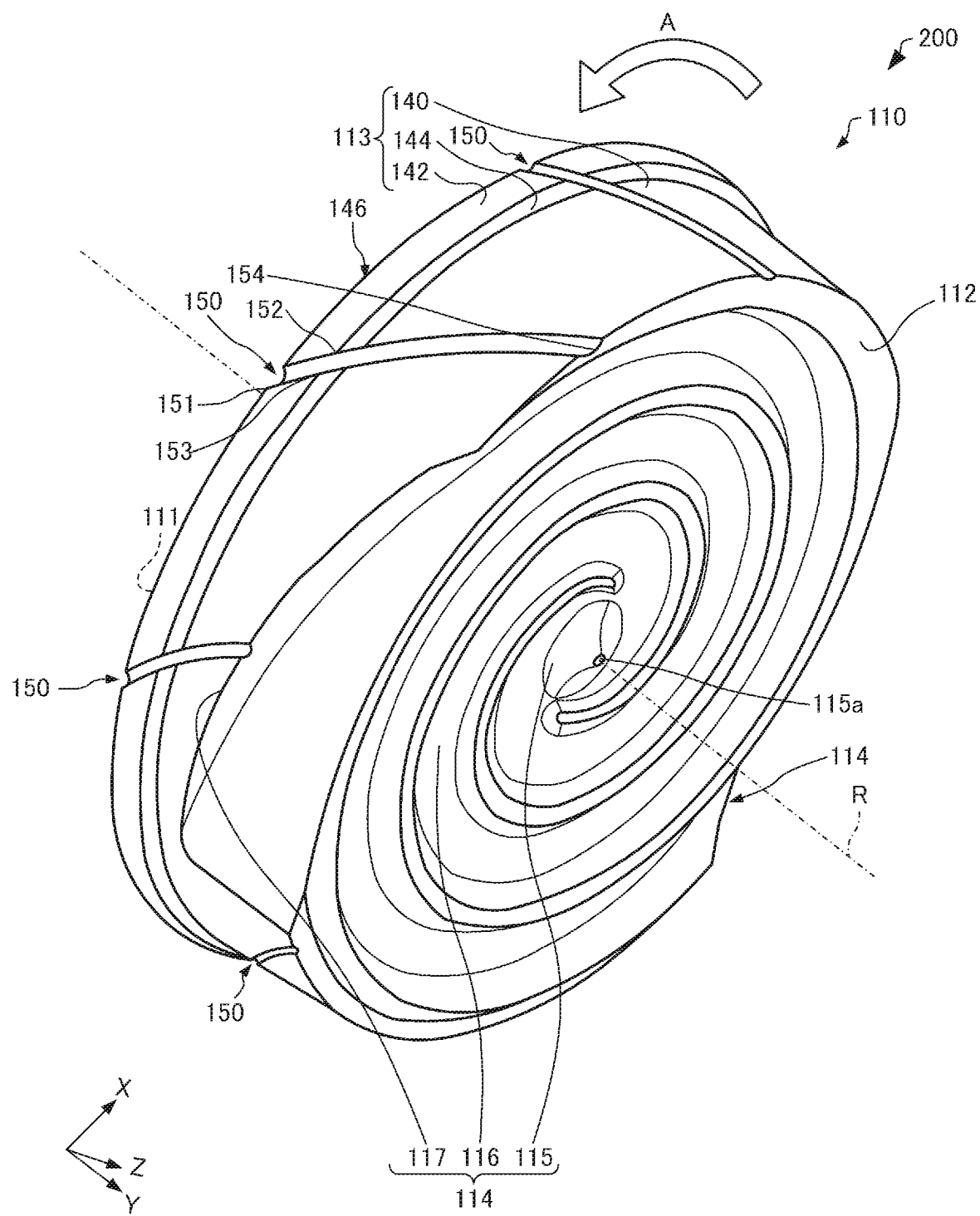
FIG. 9 is a perspective view schematically showing a flat screw of an injection molding device according to a first modification according of the embodiment.

Next, an injection molding device according to a first modification of the embodiment will be described with reference to the drawings. FIG. 9 is a perspective view schematically showing the flat screw 110 of an injection molding device 200 according to the first modification of the embodiment.

Hereinafter, in the injection molding device 200 according to the first modification of the embodiment, members having the same functions as constituent members of the injection molding device 100 according to the embodiment described above are denoted by the same reference numerals, and detailed description thereof is omitted. This is the same in an injection molding device according to a second modification to be described later.

In the injection molding device 100 described above, the recessed portion 150 formed in the flat screw 110 is a notch formed in the second side surface 142 and the coupling surface 144 as shown in FIG. 3.

On the other hand, in the injection molding device 200, the recessed portion 150 formed in the flat screw 110 is a groove formed in the first side surface 140 and the second side surface 142 as shown in FIG. 9. The recessed portion 150 may be formed from the motor surface 111 to the groove formation surface 112 of the flat screw 110. The recessed portion 150 may be formed in a spiral shape from the motor surface 111 to the groove formation surface 112. The first end 151 of the recessed portion 150 on the side opposite to the barrel 120 side is positioned forward of the fourth end 154 of the recessed portion 150 on the barrel 120 side in the rotation direction A of the flat screw 110.

Figure 10:
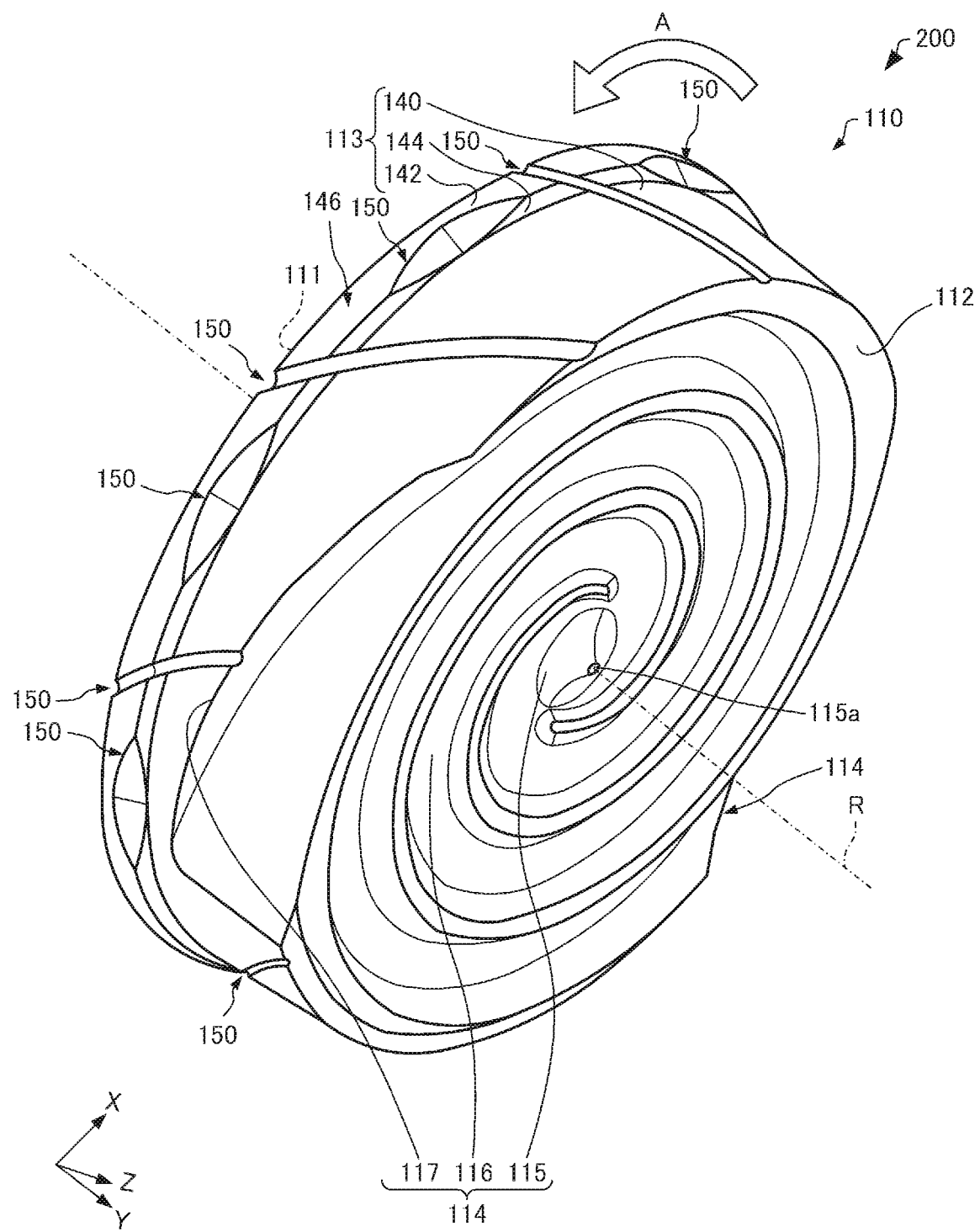
FIG. 10 is a perspective view schematically showing the flat screw of the injection molding device according to the first modification of the embodiment.

As shown in FIG. 10, both the notch formed in the second side surface 142 and the coupling surface 144 and the groove formed in the first side surface 140 and the second side surface 142 may be formed as the recessed portion 150 in the flat screw 110. Accordingly, the material entering the gap can be scraped out by both the notch and the groove as the recessed portion 150.

2.2. Second Modification

Figure 11:
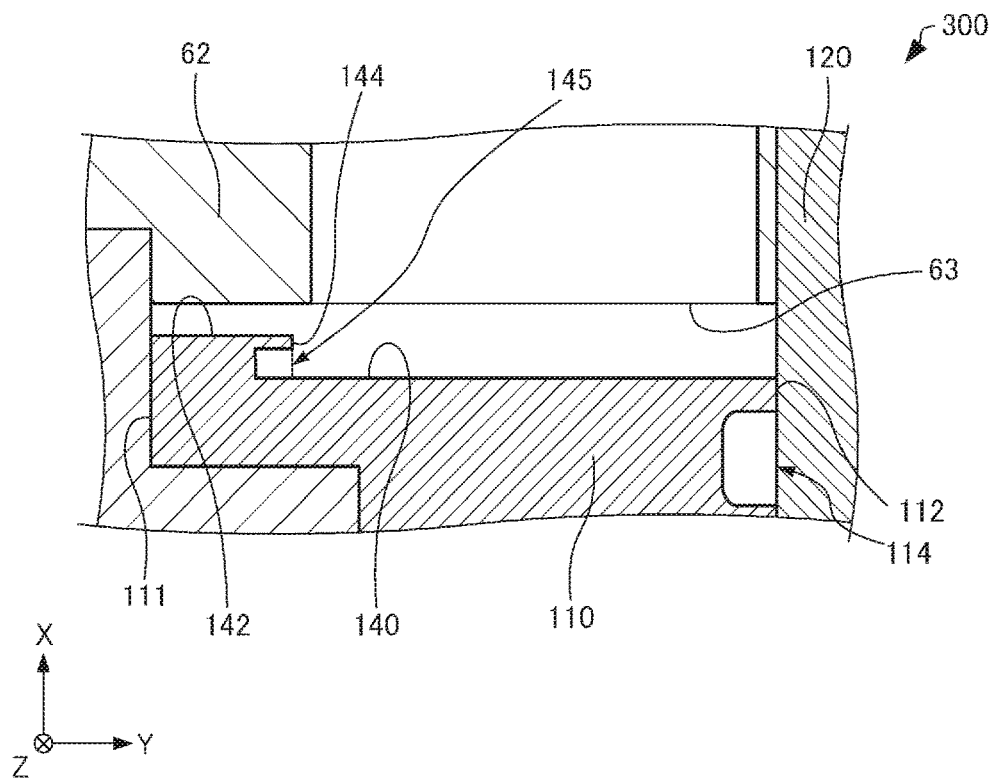
FIG. 11 is a cross-sectional view schematically showing an injection molding device according to a second modification of the embodiment.

Next, an injection molding device according to a second modification of the embodiment will be described with reference to the drawings. FIG. 11 is a cross-sectional view schematically showing the flat screw 110 of an injection molding device 300 according to the second modification of the embodiment.

In the injection molding device 100 described above, as shown in FIG. 5, the coupling surface 144 is a planar surface.

On the other hand, in the injection molding device 300, as shown in FIG. 11, a hollow portion 145 is formed in the coupling surface 144.

The hollow portion 145 is formed, for example, along the outer periphery of the flat screw 110. When viewed from the Y-axis direction, for example, the hollow portion 145 surrounds the groove formation surface 112. In the shown example, the first side surface 140 is continuous with an inner surface of the hollow portion 145.

Figure 12:
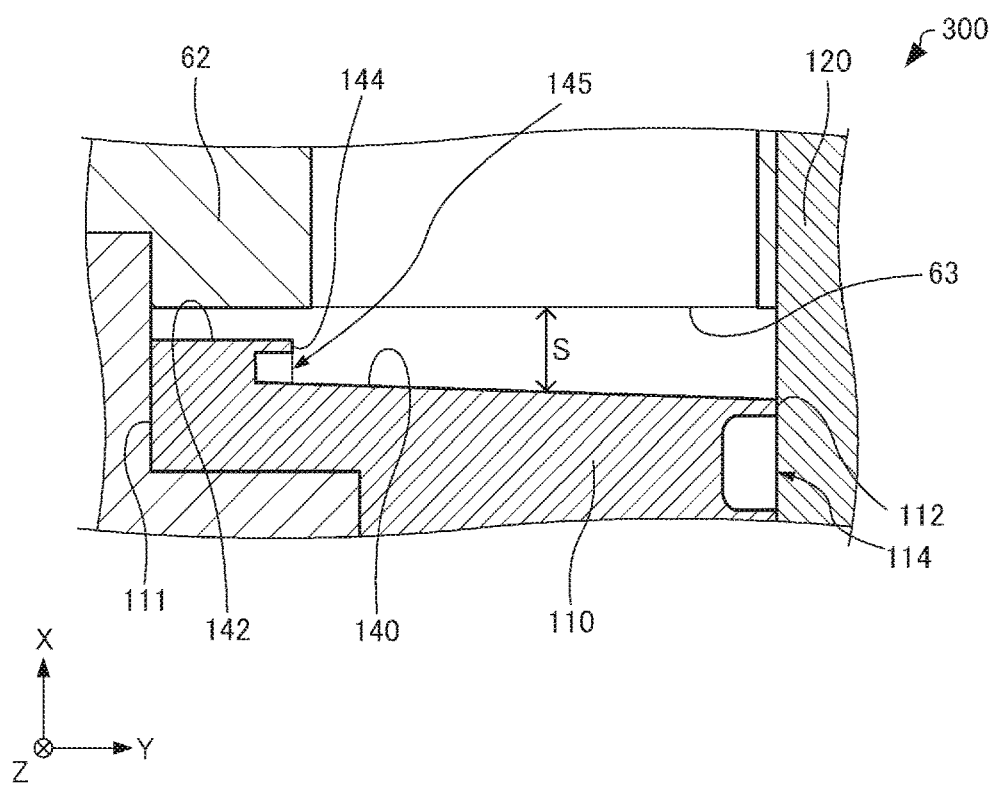
FIG. 12 is a cross-sectional view schematically showing the injection molding device according to the second modification of the embodiment.

As shown in FIG. 12, the first side surface 140 may be inclined such that a distance S between the first side surface 140 and the screw case 62 increases toward the barrel 120. The distance S may gradually increase toward the barrel 120. Although not shown, the hollow portion 145 may not be formed in the coupling surface 144, and the distance S may gradually increase toward the barrel 120.

Figure 13:
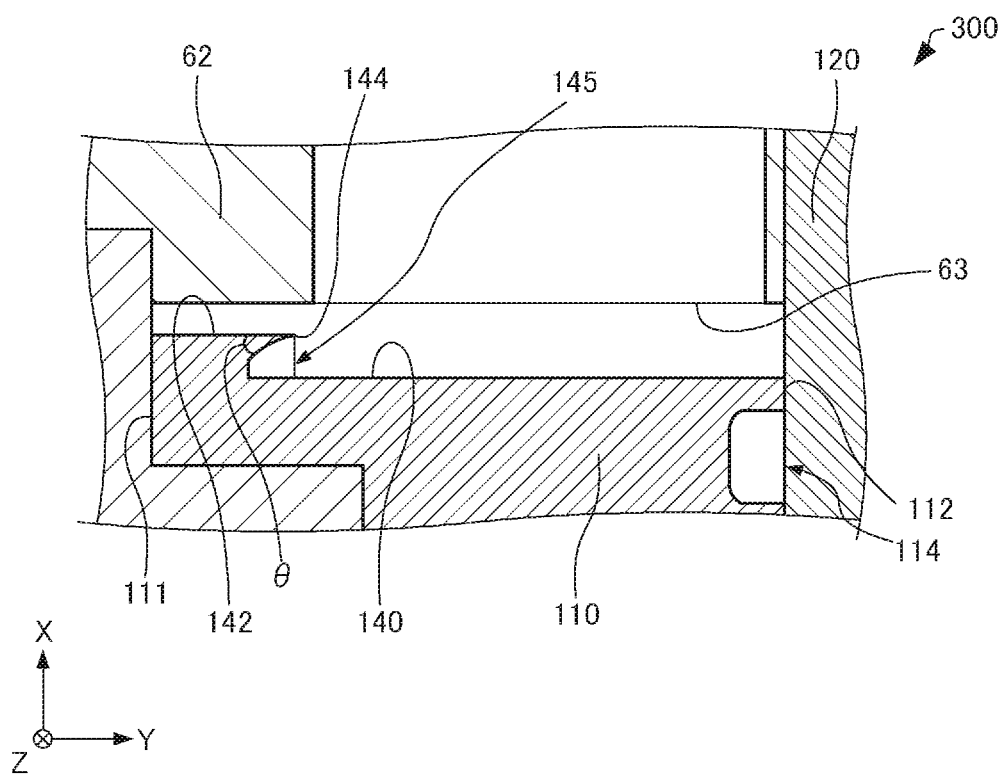
FIG. 13 is a cross-sectional view schematically showing the injection molding device according to the second modification of the embodiment.

As shown in FIG. 13, the coupling surface 144 may be inclined at an acute angle with respect to the second side surface 142. That is, the coupling surface 144 may be inclined at an inclination angle θ with respect to the second side surface 142, and the inclination angle θ may be an acute angle. Although not shown, the hollow portion 145 may not be formed in the coupling surface 144, and the coupling surface 144 may be inclined at an acute angle with respect to the second side surface 142.

In the plasticizing device 60 of the injection molding device 300, the hollow portion 145 is formed in the coupling surface 144. Therefore, in the plasticizing device 60, powder or residue of the material can be received by the hollow portion 145. Accordingly, it is possible to prevent the powder or residue of the material from entering the gap between the second side surface 142 and the screw case 62. The hollow portion 145 may temporarily store the powder or residue of the material.

In the plasticizing device 60 of the injection molding device 300, for example, the first side surface 140 is inclined such that the distance S between the first side surface 140 and the screw case 62 increases toward the barrel 120. Therefore, in the plasticizing device 60, the powder or residue of the material is easily fed to the barrel 120 side.

In the plasticizing device 60 of the injection molding device 300, for example, the coupling surface 144 is inclined at an acute angle with respect to the second side surface 142. Therefore, in the plasticizing device 60, the material is less likely to enter the gap between the second side surface 142 and the screw case 62.

2.3. Third Modification

Next, an injection molding device according to a third modification of the embodiment will be described. Hereinafter, in the injection molding device according to the third modification of the embodiment, points different from the example of the injection molding device 100 according to the embodiment described above will be described, and description of similar points will be omitted.

In the injection molding device 100 described above, the material supplied from the material supply unit 10 is an elastomer.

On the other hand, in the injection molding device according to the third modification of the embodiment, the material supplied from the material supply unit 10 is a material other than the elastomer, or a material obtained by adding another component to the elastomer.

The material supplied from the material supply unit 10 is, for example, various materials such as thermoplastic materials, metal materials, and ceramic materials as main materials. Here, the "main material" means a material serving as a core material forming the shape of the molded product molded by the injection molding device 100, and means a material having a content of 50% by mass or more in the molded product. The materials described above include those materials obtained by melting these main materials alone, and those materials obtained by melting the main materials and a part of contained components into a paste shape.

Examples of the thermoplastic material include a thermoplastic resin. Examples of the thermoplastic resin include acrylonitrile butadiene styrene (ABS) resin, polyethylene (PE), polypropylene (PP), polyethylene terephthalate (PET), and polyvinyl chloride (PVC).

The thermoplastic resin may be a general-purpose engineering plastic. Examples of the general-purpose engineering plastic include polyacetal (POM), polyamide (PA), polylactic acid (PLA), polyphenylene sulfide (PPS), polycarbonate (PC), and modified polyphenylene ether (m-PPE).

The thermoplastic resin may be super engineering plastic. Examples of the super engineering plastic include polysulfone (PSU), polyethersulfone (PES), polyphenylene sulfide (PPS), polyarylate (PAR), polyimide (PI), polyamide-imide (PAI), polyetherimide (PEI), and polyether ether ketone (PEEK).

In addition to a pigment, a metal, and a ceramic, additives such as a wax, a flame retardant, an antioxidant, and a heat stabilizer may be mixed into the thermoplastic material. In the plasticizing device 60, the thermoplastic material is plasticized and converted into a molten state by rotation of the flat screw 110 and heating of the heater 130. The plasticized material generated in this manner is deposited from the nozzle 80, and then is cured due to a decrease in temperature. It is desirable that the thermoplastic material is dispensed from the nozzle 80 in a completely molten state by being heated to a glass transition point or higher.

In the plasticizing device 60, for example, a metal material may be used as a main material instead of the above-described thermoplastic material. In this case, it is desirable that a powder material obtained by powdering the metal material is mixed with a component that melts when the plasticized material is generated, and the mixture is fed into the plasticizing device 60.

Examples of the metal material include a single metal such as magnesium (Mg), iron (Fe), cobalt (Co), chromium (Cr), aluminum (Al), titanium (Ti), copper (Cu), and nickel (Ni), or an alloy containing one or more of these metals, maraging steel, stainless steel, cobalt chromium molybdenum, a titanium alloy, a nickel alloy, an aluminum alloy, a cobalt alloy, and a cobalt chromium alloy.

In the plasticizing device 60, a ceramic material may be used as the main material instead of the above-described metal material. Examples of the ceramic material include an oxide ceramic such as silicon dioxide, titanium dioxide, aluminum oxide, and zirconium oxide, and a non-oxide ceramic such as aluminum nitride.

The powder material of the metal material or the ceramic material supplied from the material supply unit 10 may be a mixed material obtained by mixing a plurality of types of powder of the single metal, powder of the alloy, or powder of the ceramic material. The powder material made of the metal material or the ceramic material may be coated with, for example, the thermoplastic resin described above or another thermoplastic resin. In this case, in the plasticizing device 60, the thermoplastic resin coated with the powder material may melt to develop fluidity.

For example, a solvent can be added to the powder material of the metal material or the ceramic material to be supplied from the material supply unit 10. Examples of the solvent include: water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetate (for example, tetrabutylammonium acetate); and ionic liquids such as butyl carbitol acetate.

In addition, for example, a binder may be added to the powder material of the metal material or the ceramic material supplied from the material supply unit 10. Examples of the binder include an acrylic resin, an epoxy resin, a silicone resin, a cellulose-based resin, other synthetic resins, PLA, PA, PPS, PEEK, and other thermoplastic resins.

3. Three-Dimensional Shaping Device

Figure 14:
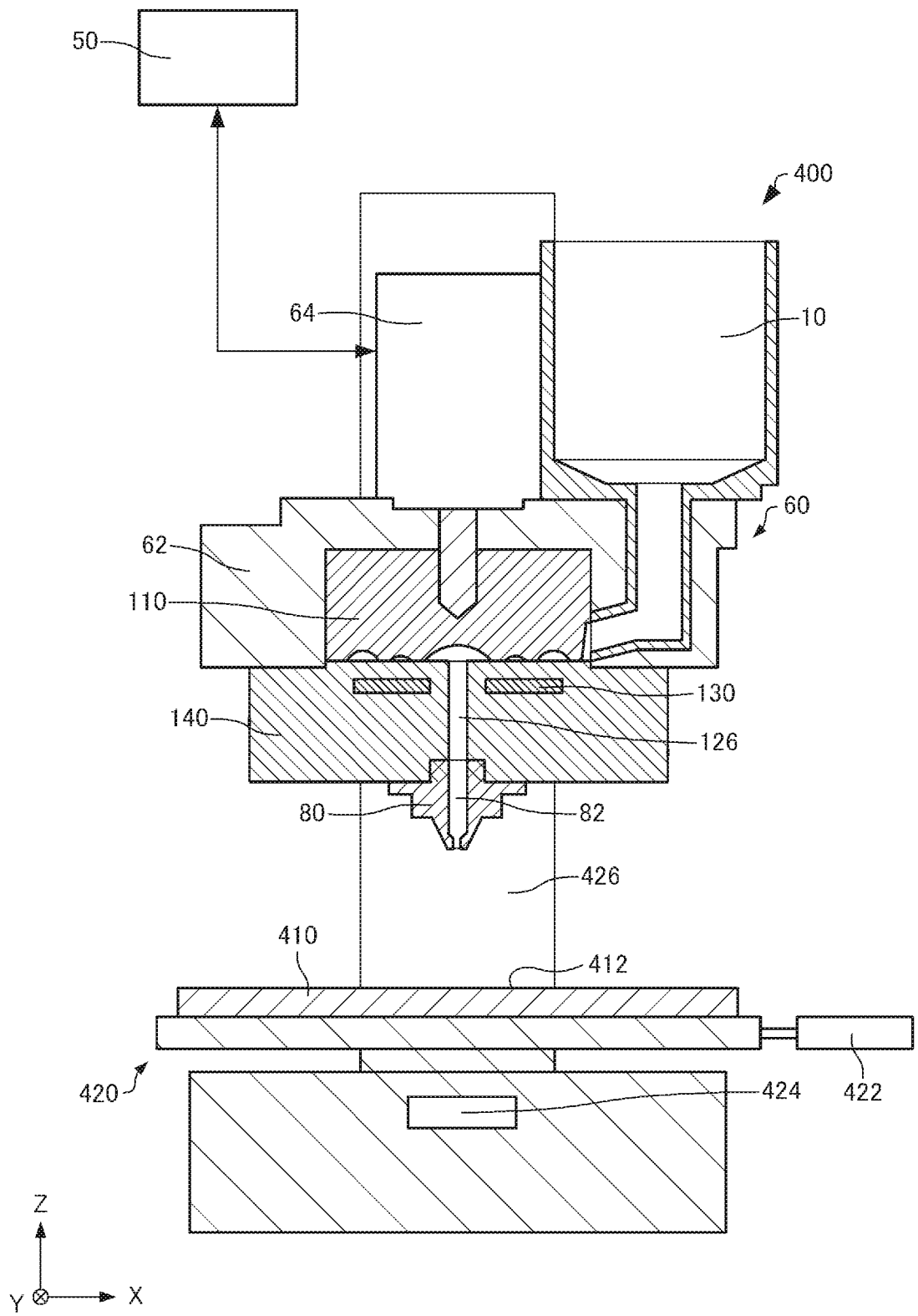
FIG. 14 is a cross-sectional view schematically showing a three-dimensional shaping device according to the embodiment.

Next, a three-dimensional shaping device according to the embodiment will be described with reference to the drawings. FIG. 14 is a cross-sectional view schematically showing a three-dimensional shaping device 400 according to the embodiment.

For example, as shown in FIG. 14, the three-dimensional shaping device 400 includes the material supply unit 10, the control unit 50, the plasticizing device 60, the nozzle 80, a stage 410, and a position changing unit 420. The three-dimensional shaping device 400 is a three-dimensional shaping device of fused deposition modeling (FDM) (registered trademark) type. For convenience, in FIG. 14, the flat screw 110 of the plasticizing device 60 is shown in a simplified manner.

The nozzle 80 dispenses the plasticized material supplied from the plasticizing device 60 toward the stage 410. Specifically, the three-dimensional shaping device 400 changes relative positions of the nozzle 80 and the stage 410 by driving the position changing unit 420 while dispensing the plasticized material from the nozzle 80 to the stage 410. Accordingly, the three-dimensional shaping device 400 shapes a three-dimensional shaping object having a desired shape on the stage 410.

The stage 410 is provided below the nozzle 80. In the shown example, the stage 410 has a rectangular parallelepiped shape. The stage 410 supports the plasticized material dispensed from the nozzle 80. The stage 410 has a deposition surface 412 on which the plasticized material is deposited.

A material of the stage 410 is, for example, a metal such as aluminum. The stage 410 may be formed of a metal plate and an adhesive sheet provided on the metal plate. In this case, the deposition surface 412 is formed of the adhesive sheet. The adhesive sheet can improve an adhesion between the stage 410 and the plasticized material dispensed from the nozzle 80.

Although not shown, the stage 410 may be formed of a metal plate in which a groove is formed, and an underlayer provided to fill the groove. In this case, the deposition surface 412 is formed of the underlayer. A material of the underlayer is, for example, the same as the plasticized material. The underlayer can improve the adhesion between the stage 410 and the plasticized material dispensed from the nozzle 80.

The position changing unit 420 supports the stage 410. The position changing unit 420 changes the relative positions of the nozzle 80 and the stage 410. In the shown example, the position changing unit 420 changes the relative positions of the nozzle 80 and the stage 410 in the X-axis direction and the Y-axis direction by moving the stage 410 in the X-axis direction and the Y-axis direction. Further, the position changing unit 420 changes the relative positions of the nozzle 80 and the stage 410 in the Z-axis direction by moving the nozzle 80 in the Z-axis direction.

The position changing unit 420 includes, for example, a first electric actuator 422, a second electric actuator 424, and a third electric actuator 426. The first electric actuator 422 moves the stage 410 in the X-axis direction. The second electric actuator 424 moves the stage 410 in the Y-axis direction. The third electric actuator 426 moves the nozzle 80 in the Z-axis direction. The third electric actuator 426 supports, for example, the screw case 62 of the plasticizing device 60.

A configuration of the position changing unit 420 is not particularly limited as long as the relative positions of the nozzle 80 and the stage 410 can be changed. For example, the position changing unit 420 may move the stage 410 in the Z-axis direction and move the nozzle 80 in the X-axis direction and the Y-axis direction, or may move the stage 410 or the nozzle 80 in the X-axis direction, the Y-axis direction, and the Z-axis direction.

The above-described embodiment and modifications are examples, and the present disclosure is not limited thereto. For example, the embodiment and the modifications may be combined as appropriate.

The present disclosure includes substantially the same configuration, for example, a configuration having the same function, method, and result, or a configuration having the same object and effect, as the configuration described in the embodiment. The present disclosure includes a configuration in which a non-essential portion of the configuration described in the embodiment is replaced. The present disclosure includes a configuration capable of achieving the same function and effect or a configuration capable of achieving the same object as the configuration described in the embodiment. The present disclosure includes a configuration obtained by adding a known technique to the configuration described in the embodiment.

The following contents are derived from the above-described embodiment and modifications.

A plasticizing device according to an aspect includes:
a motor;
a flat screw having a groove formation surface in which a spiral groove is formed and configured to rotate about a rotation axis by the motor;
a barrel having a facing surface facing the groove formation surface in a direction of the rotation axis and having a communication hole into which a plasticized material obtained by plasticizing a material flows;
a heater configured to heat the material supplied between the groove formation surface and the facing surface; and
a screw case accommodating the flat screw and having a supply port through which the material is supplied to the groove, in which
the flat screw includes
a first side surface in which an introduction port for introducing the material from the supply port into the groove is partially formed, and
a second side surface provided on a side farther away from the barrel than the first side surface,
a first distance which is a shortest distance between the first side surface and the screw case is larger than a second distance which is a shortest distance between the second side surface and the screw case, and
a recessed portion is formed in the second side surface.

According to the plasticizing device, even when the material enters a gap between the second side surface and the screw case, it is possible to reduce the inhibition of the rotation of the flat screw. Accordingly, the material can be stably plasticized.

In the plasticizing device according to an aspect,
the material may include an elastomer,
a shape of the material may be a pellet shape,
the first distance may be larger than a maximum length of the material, and
the second distance may be smaller than the maximum length of the material.

According to the plasticizing device, the material is less likely to enter the gap between the second side surface and the screw case.

In the plasticizing device according to an aspect,
an end of the second side surface on the barrel side may be positioned outside a contour of the supply port when viewed from a direction orthogonal to the direction of the rotation axis, and
a third distance which is a shortest distance between the end and the contour of the supply port in the direction of the rotation axis may be smaller than the second distance.

According to the plasticizing device, the material is less likely to enter the gap between the second side surface and the screw case, and clogging of the material in the supply port can be prevented.

In the plasticizing device according to an aspect,
a plurality of the recessed portions may be formed at intervals along an outer periphery of the flat screw.

According to the plasticizing device, even when the material enters the gap between the second side surface and the screw case, the material entering the gap can be further scraped out.

In the plasticizing device according to an aspect,
a first end of the recessed portion opposite to the barrel may be positioned forward of a second end of the recessed portion on the barrel side in the second side surface in a rotation direction of the flat screw.

According to the plasticizing device, even when the material enters the gap between the second side surface and the screw case, the material entering the gap can be gradually scraped off together with the flat screw by a portion coupling the first end and the second end in an outer edge of the recessed portion.

In the plasticizing device according to an aspect, the flat screw may have a coupling surface coupling the first side surface and the second side surface, and the coupling surface may be orthogonal to or inclined at an acute angle with respect to the second side surface.

According to the plasticizing device, the material is less likely to enter the gap between the second side surface and the screw case.

In the plasticizing device according to an aspect, a hollow portion may be formed in the coupling surface.

According to the plasticizing device, powder or residue of the material can be received by the hollow portion. Accordingly, it is possible to prevent the powder or residue of the material from entering the gap between the second side surface and the screw case.

In the plasticizing device according to an aspect, the first side surface may be inclined such that a distance between the first side surface and the screw case increases toward the barrel.

According to the plasticizing device, powder or residue of the material is easily fed to the barrel side.

An injection molding device according to an aspect includes:

the plasticizing device according to the aspect; and a nozzle configured to inject the plasticized material into a molding mold.

A three-dimensional shaping device according to an aspect includes:

the plasticizing device according to the aspect; and a nozzle configured to dispense the plasticized material toward a stage.

What is claimed is:

1. A plasticizing device comprising: a motor; a flat screw having a groove formation surface in which a spiral groove is formed and configured to rotate about a rotation axis by the motor; a barrel having a facing surface facing the groove formation surface in a direction of the rotation axis and having a communication hole into which a plasticized material obtained by plasticizing a material flows; a heater configured to heat the material supplied between the groove formation surface and the facing surface; and a screw case accommodating the flat screw and having a supply port through which the material is supplied to the groove, wherein the flat screw includes a first side surface in which an introduction port for introducing the material from the supply port into the groove is partially formed, and a second side surface provided on a side farther away from the barrel than the first side surface, a first distance which is a shortest distance between the first side surface and the screw case is larger than a second distance which is a shortest distance between the second side surface and the screw case, a coupling surface coupling the first side surface and the second side surface that is orthogonal to or inclined at an acute angle with respect to the second side surface with a hollow portion is formed in the coupling surface, and a recessed portion is formed in the second side surface.

2. The plasticizing device according to claim 1, wherein the material includes an elastomer, a shape of the material is a pellet shape, the first distance is larger than a maximum length of the material, and the second distance is smaller than the maximum length of the material.

3. The plasticizing device according to claim 1, wherein an end of the second side surface on the barrel side is positioned outside a contour of the supply port when viewed from a direction orthogonal to the direction of the rotation axis, and a third distance which is a shortest distance between the end and the contour of the supply port in the direction of the rotation axis is smaller than the second distance.

4. The plasticizing device according to claim 1, wherein a plurality of the recessed portions are formed at intervals along an outer periphery of the flat screw.

5. The plasticizing device according to claim 1, wherein a first end of the recessed portion opposite to the barrel is positioned forward of a second end of the recessed portion on the barrel side in the second side surface in a rotation direction of the flat screw.

6. The plasticizing device according to claim 1, wherein the first side surface is inclined such that a distance between the first side surface and the screw case increases toward the barrel.

7. An injection molding device comprising:

the plasticizing device according to claim 1; and a nozzle configured to inject the plasticized material into a molding mold.

* * * * *